Jan. 30, 1951 P. RUSNOV 2,539,863
METHOD OF FINISHING TUBES
Filed Dec. 12, 1945 2 Sheets-Sheet 1
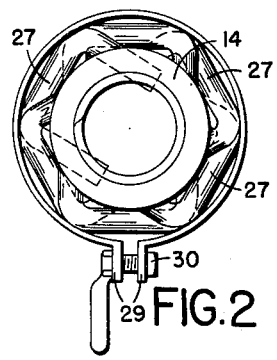
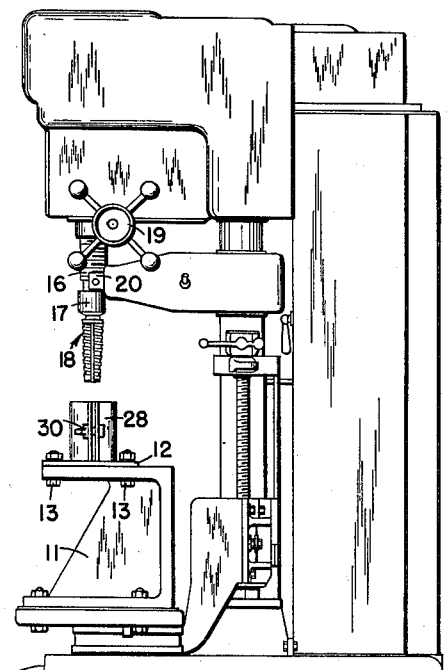
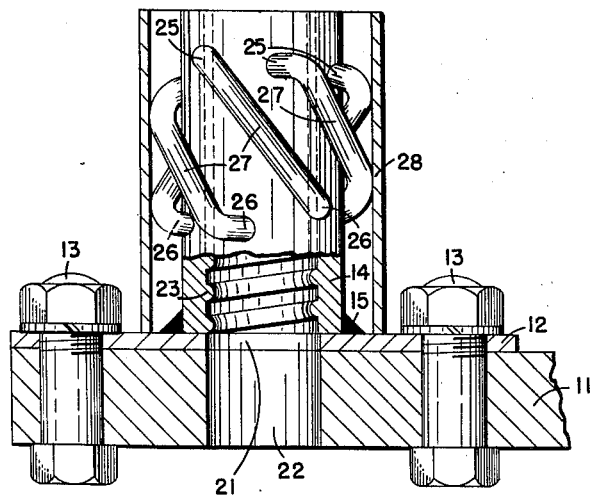
INVENTOR.
PETER RUSNOV
BY
Kwis, Hudson, Boughton & Williams
ATTORNEYS Jan. 30, 1951 P. RUSNOV 2,539,863
METHOD OF FINISHING TUBES Filed Dec. 12, 1945 2 Sheets-Sheet 2

INVENTOR.
PETER RUSNOV
BY
Kwis, Hudson, Boughton & Williams
ATTORNEYS

Patented Jan. 30, 1951

2,539,863

UNITED STATES PATENT OFFICE 2,539,863

METHOD OF FINISHING TUBES

Peter Rusnov, Cleveland, Ohio, assignor to The Cleveland Pneumatic Tool Company, Cleveland, Ohio, a corporation of Ohio Application December 12, 1945, Serial No. 634,568

6 Claims. (Cl. 90—11)

This invention relates to improvements in method of finishing tubes. Primarily the invention is intended to be employed in the manufacture of ball return tubes for ball bearing screws, although similar elements of cylindrical cross-section may be finished by means of the invention. The necessity for maintaining close tolerances and exact shape in the ball return tube of the nut for a ball bearing screw has made it a reasonable practice to form one end of the tube at a time, and in some cases to fashion the tube in two matching halves. In accordance with the present invention means are provided not only for finishing both ends of a tube simultaneously, but also for finishing a plurality of tubes at both ends in a single operation.

One of the objects of the invention therefore is the provision of novel means for finishing ball return tubes and the like accurately, rapidly and economically.

Another object is the provision of a novel workholder for use in carrying out the invention.

Other objects and features of novelty will appear as I proceed with the description of that embodiment of the invention which, for the purposes of the present application, I have illustrated in the accompanying drawings, in which Fig. 1 is a side elevational view of a tapping machine equipped with fixtures for carrying out the invention.

Fig. 2 is a plan view of a workholder and clamp for supporting a plurality of tubes to be finished.

Fig. 3 is an elevational view partly in vertical section of the workholder and clamp mounted in position upon a tapping machine.

Fig. 4 is an elevational view of a tap which may be employed as the rotary cutting tool.

Fig. 5 is an end view of the same.

Figure 6:
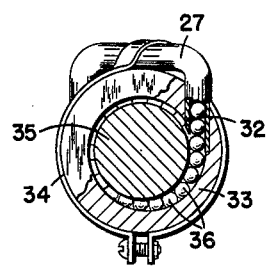
Fig. 6 is an end view, partly in cross-section, of a ball bearing screw and nut showing the application of a ball return tube formed in accordance with the invention.

Referring particularly to Fig. 1, 10 is the base of a machine frame upon which is mounted a bracket 11 that supports a supplemental base plate 12 which is held rigidly in place by means of bolts 13. A substantially cylindrical workholder 14 is carried by base plate 12, being fixed in position thereupon by a weld 15 or other suitable securing means.

Plate 12 is so mounted that the axis of workholder 14 is disposed in vertical alignment with the spindle 16 of the tapping machine, the spindle carrying a chuck 17 in which is mounted a tap 18 of special construction. The tap 18 is rotated by the spindle 16. Axial movement of the tap and spindle is effected in either of two ways, that is by a hand wheel 19 for rapid traverse and by threaded jaws 20 cooperating with the threaded spindle 16 to traverse the tap according to its lead. Base plate 12 and bracket 11 have holes 21 and 22 respectively bored therethrough in alignment with the workholder and of a diameter to permit the outside diameter of tap 18 to pass freely therethrough.

The workholder 14 may have an inwardly projecting thread 23 of approximately semi-cylindrical cross-section, and the semi-cylindrical groove 24 of the tap thread mates with the thread 23 on the workholder. In the cylindrical holder 14 there are formed a plurality of longitudinally spaced pairs of bores 25 and 26, each of which extends into the cylindrical holder with its axis disposed substantially tangent to the outer diameter of the passage through the holder. The bores 25 are arranged in a helical path, as are also the bores 26, and the lead of each of these two paths is the same as that of the thread 23 and the tap thread. The bores 25 and 26 of each pair are parallel, and they extend inwardly to meet the diametrical plane which is perpendicular to them. Each bore on one side breaks through the inner surface of the cylinder, and the end of the bore on the side which does not break through serves as a stop for the end of the tube. Preferably the bores 25 and 26 are so located that the U-shaped tubes 27 when mounted therein are distributed evenly around the periphery of the holder 14, as shown in Figs. 2 and 3. In order to avoid confusion only one of the tubes is shown in its full extent in Fig. 2.

Means is provided to hold each of the tubes 27 with its ends against the stops in the bores 25 and 26. Conveniently, this means may take the form of a split cylinder 28 provided with flanges 29 having apertures therein through which one or more quick set bolts 30 extend, and by means of which the cylinder 28 may be drawn up to embrace the tubes and hold them against accidental movement. When the finishing operation upon a given set of tubes has been completed, the bolts 30 are loosened and the cylinder raised out of clamping position, after which the tubes may be removed and a new set put in place.

Figure 7:
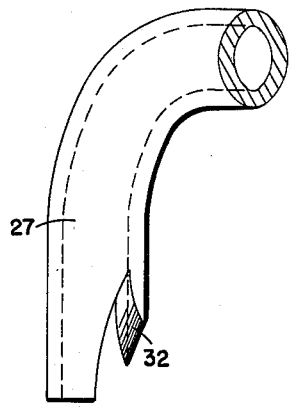
Figs. 7 and 8 are large scale elevational views at right angles to each other showing a portion of a ball return tube.
Figure 8:
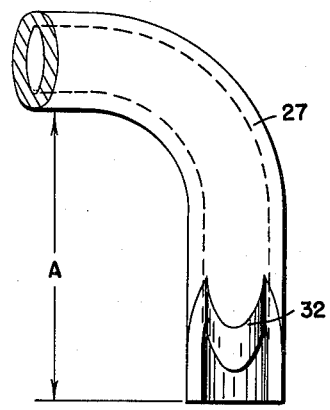

The action of the mechanism in finishing the ends of the tubes by means of traversing the rotating tap 18 through the holder 14 will be obvious to those skilled in the art. The bores 25 and 26 are so disposed that the ends of the tubes are centered with respect to the threads 23. Hence the high spots 31 of the tap cut into the tubes more deeply along the sides of the tube ends as indicated in Figs. 7 and 8, and leave a central lip 32 which in the assembled ball bearing screw and nut extend into the thread groove of the screw, as indicated in Fig. 6. The root diameter of the tap is great enough however to provide the proper amount of clearance between the lip 32 and the root of the thread groove.

The bores in the nut 33, Fig. 6, for the reception of the tube ends are formed and disposed substantially like the bores of one pair in workholder 14, and the tube when set in the nut is clamped in position by suitable means such as by a band 34, shown in Fig. 6. In this figure the U-screw element is illustrated at 35 and the balls at 36.

The depth of the bores 25 and 26 and of the corresponding bores in the nut 33 are held to a close tolerance. The function of lip 32 of guiding the balls 36 out of their helical races and back into them again is therefore maintained uniform and efficient. The dimension A in Fig. 8 is also maintained to a close tolerance for the same reason and further for assuring efficient clamping action of the split cylinder 28.

The accuracy of the finished product will be dependent upon the lead screw 16, the threaded jaws 20, the tap 18 and the fixture 12, 14, and since all of these parts can be formed with a high degree of precision, the work done with them can also be maintained at a high standard.

Having thus described my invention, I claim:

1. The method of finishing the parallel ends of a U-shaped tube, which comprises mounting said ends in longitudinally spaced parallel bores in a work holder having a cylindrical cavity extending therethrough, said bores being of a depth and location enabling a portion of each end of said tubes to protrude into said cavity, and feeding a cutting tool through said cavity while said tool and work holder rotate relative to each other.

2. The method of finishing the parallel ends of a U-shaped tube, which comprises mounting said ends in longitudinally spaced parallel bores in a work holder having a cylindrical cavity extending therethrough, each bore on one side breaking through the inner surface of said cavity, and feeding a cutting tool through said cavity while said tool and work holder rotate relative to each other.

3. The method of finishing the parallel ends of a U-shaped tube, which comprises mounting said ends in longitudinally spaced parallel bores in a work holder having a cylindrical cavity extending therethrough, each bore on one side breaking through the inner surface of said cavity and on the other side serving as a stop for the end of the tube, and feeding a cutting tool through said cavity while said tool and work holder rotate relative to each other.

4. The method of finishing the parallel ends of a U-shaped tube, which comprises mounting said ends in a work holder having a cylindrical bore extending therethrough, said ends being made to extend partway into said bore with their axis substantially tangent to the diameter of said bore, and feeding a cutting tool through said bore while said tool and work holder rotate relative to each other.

5. The method of finishing the ends of a U-shaped tube, which comprises mounting said ends in a stationary work holder having a cylindrical bore extending therethrough and disposed in vertical alignment with the tap carrying spindle of a tapping machine, said ends being made to extend partway into said bore, and feeding the tap through said bore while rotated by said spindle.

6. The method of finishing the parallel ends of a U-shaped tube, which comprises mounting said ends in a work holder having a threaded bore extending therethrough, said ends being made to extend partway into said bore in centered position with respect to its threads, and feeding a rotating tap through said bore with its threads mating with the threads of said bore.

PETER RUSNOV.

REFERENCES CITED

The following references are of record in the file of this patent:

UNITED STATES PATENTS

| Number | Name | Date |
|---|---|---|
| 2,003,570 | Albertson | June 4, 1935 |
| 2,006,916 | Griffith | July 2, 1935 |
| 2,200,544 | Drummond | May 14, 1940 |
| 2,401,078 | Johnson | May 28, 1946 |
| 2,412,454 | Hain | Dec. 10, 1946 |

FOREIGN PATENTS

| Number | Country | Date |
|---|---|---|
| 105,715 | Great Britain | Apr. 26, 1917 |
| 393,608 | Germany | Apr. 12, 1924 |